United States Patent
Zhang et al.

(10) Patent No.: US 10,688,546 B2
(45) Date of Patent: Jun. 23, 2020

(54) BIOGAS RESIDUE-BASED IN SITU AND ECTOPIC COUPLED DETOXIFICATION METHOD FOR HEXAVALENT CHROMIUM-CONTAINING SITES AND SOIL REMEDIATION AGENT

(71) Applicant: QINGDAO TECHNOLOGICAL UNIVERSITY, Qingdao, Shandong (CN)

(72) Inventors: Dalei Zhang, Shandong (CN); Yuhao Zhao, Shandong (CN); Lu Chen, Shandong (CN); Jianju Li, Shandong (CN); Feng Zhao, Shandong (CN); Wentao Luo, Shandong (CN)

(73) Assignee: QINGDAO TECHNOLOGICAL UNIVERSITY, Qingdao (CN)

( * ) Notice: Subject to any disclaimer, the term of this patent is extended or adjusted under 35 U.S.C. 154(b) by 0 days.

(21) Appl. No.: 16/206,750

(22) Filed: Nov. 30, 2018

(65) Prior Publication Data
US 2019/0091741 A1 Mar. 28, 2019

Related U.S. Application Data

(63) Continuation of application No. PCT/CN2017/086377, filed on May 27, 2017.

(30) Foreign Application Priority Data

May 30, 2016 (CN) .......................... 2016 1 0370282

(51) Int. Cl.
*B09C 1/00* (2006.01)
*B09C 1/08* (2006.01)
*C09K 17/48* (2006.01)

(52) U.S. Cl.
CPC ............... *B09C 1/08* (2013.01); *C09K 17/48* (2013.01); *B09C 2101/00* (2013.01)

(58) Field of Classification Search
CPC ............... B09C 1/00; B09C 1/08; B09C 1/10
See application file for complete search history.

(56) References Cited

U.S. PATENT DOCUMENTS

| 5,562,588 | A | * | 10/1996 | Higgins | B09C 1/10 405/128.5 |
| 6,066,772 | A | * | 5/2000 | Hater | B09C 1/10 149/124 |
| 6,719,902 | B1 | * | 4/2004 | Alvarez | B09C 1/002 210/170.07 |
| 8,969,422 | B2 | * | 3/2015 | Zhou | C10J 3/30 518/700 |
| 9,776,225 | B2 | * | 10/2017 | Myre | B09C 1/02 |
| 10,160,681 | B2 | * | 12/2018 | Y Hu | A01G 7/02 |

FOREIGN PATENT DOCUMENTS

| CN | 1560191 A | 1/2005 |
| CN | 102206494 A | 10/2011 |
| CN | 103978026 A | 8/2014 |
| CN | 103981875 A | 8/2014 |

* cited by examiner

*Primary Examiner* — Janine M Kreck
(74) *Attorney, Agent, or Firm* — Wayne & Ken, LLC; Tony Hom

(57) ABSTRACT

Disclosed is a biogas residue-based in situ and ectopic coupled detoxification method for hexavalent chromium site and soil remediation agent. The method is applied to chromium-containing soil by formulating biogas residue, a carbon source and a sulfate into said soil remediation agent. Special construction and maintenance methods are adopted to achieve effective reduction of hexavalent chromium in deep contaminated soil. Therefore, the biogas residue-based in situ and ectopic coupled detoxification method for hexavalent chromium-containing sites cannot only be used to remediate chromium-containing sites deep in depth at a low cost and high efficiency, but also achieve recycled utilization of waste by treating waste with one another, thereby possessing significant value in promotion and practice.

11 Claims, No Drawings

US 10,688,546 B2

BIOGAS RESIDUE-BASED IN SITU AND ECTOPIC COUPLED DETOXIFICATION METHOD FOR HEXAVALENT CHROMIUM-CONTAINING SITES AND SOIL REMEDIATION AGENT

CROSS-REFERENCE TO RELATED APPLICATIONS

This application is a continuation of International Patent Application No. PCT/CN2017/086377, filed on May 27, 2017, which claims the benefit of priority from Chinese Application No. 201610370282.3, filed on May 30, 2016. The entire contents of the aforementioned applications, including any intervening amendments thereto, are incorporated herein by reference.

TECHNICAL FIELD

The present invention relates to a novel method for treating Cr (VI)-polluted soil, particularly a biogas residue-based in situ and ectopic coupled detoxification method for hexavalent chromium-containing sites and soil remediation agent.

BACKGROUND OF THE PRESENT INVENTION

Chromium and its compounds are the basic raw materials commonly used in metallurgy, metal processing, electroplating, tanning, paint, pigments and other industries. A large amount of chromium-containing waste gas, waste water and waste residue generated during the production process of the above industries has been causing severe environmental pollution. Since Cr(VI) is a water-soluble heavy metal, some of the Cr(VI)-contaminated sites are polluted over a depth of up to 100 meters. Therefore, it has always been a great challenge in environmental protection to remediate the contaminated chromium-containing soil.

Currently, despite of numerous methods for remediation of heavily contaminated chromium-containing soil, these methods cannot provide ideal remediation effect on contaminated soil deep in depth.

SUMMARY OF THE PRESENT INVENTION

In order to overcome the deficiencies of the art, the present invention adopts a biogas residue-based in situ and ectopic coupled detoxification method for hexavalent chromium-containing sites, in which biogas residue, a carbon source and sulfate are formulated into an agent and applied to the chromium-containing soil; special construction and maintenance methods are then adopted to allow gradual seepage of the ecology-recovering bacterial agent into the ground, thereby reducing hexavalent chromium in deep contaminated soil. The method can be used to remediate chromium-containing sites deep in depth at a low cost and high efficiency, and can also achieved treating waste with one another as biogas residue are disposed during the treatment process. The method has a strategy as follows: remediating topsoil as priority, and meanwhile cultivating chromium-reducing bacteria (e.g. sulfate-reducing bacteria) in a top-layer site, then performing certain construction and maintenance to allow uniform seepage of the reducing bacterial agent into the ground.

Specifically, the technical solution of the present invention for solving the above technical problem includes steps as follows:

(1) mixing sulfate with the biogas residue or a carbon source solution at such a ratio, that contents of dry biogas residue, solid and organic carbon are respectively 0.1-20%, 0.5-25% and 0.5-25% to obtain a mixed solution, wherein a mass ratio of sulfate ($SO_4^{2-}$) to the organic carbon is 0-1:1 in the solution after the mixing; reacting the mixed solution for 0-5 days to obtain a chromium-containing soil remediation agent;

(2) excavating 1-10 m soil from a surface of the chromium-containing site, laying a geomembrane with mesh at a bottom of the excavated site, and laying an impervious material around the excavated site to build a semi-closed stockyard;

(3) breaking the soil of step (2) to less than 10 mm, tiling the broken soil on the semi-closed stockyard, mixing the tiled soil with the chromium-containing soil remediation agent and ferrous sulfate by spraying; wherein a mixing ratio between the ferrous sulfate, the tiled soil and the chromium-containing soil remediation agent is (0-0.1): 1: (0.1-0.8); entering a stockpiling period; and (4) maintaining a moisture content of the soil in a range of 5-60% in initial 5-100 days during the stockpiling period, and injecting the chromium-containing soil remediation agent or the carbon source solution into the site every 1-200 days, such that a ratio of cumulative organic carbon from the repeatedly injected chromium-containing soil remediation agent or the carbon source solution to a total Cr(VI) content in the entire site is not less than 0.5:1; wherein the site has an average annual rainfall of more than 200 mm, otherwise spraying the surface of the site with water or organic solution to allow the chromium-containing soil remediation agent to continuously seep into a lower layer of the site.

Further, in an embodiment of the present invention, the biogas residue is a solid residue in an anaerobic treatment process for organic waste of industry, municipal industry, agriculture or food industry.

Further, in an embodiment of the present invention, the anaerobic treatment process is performed by adopting a dry, semi-dry or wet treatment during the anaerobic treatment process.

Further, in an embodiment of the present invention, the carbon source solution is an organic carbon source solution.

Further, in an embodiment of the present invention, the organic carbon source solution contains at least one of alcohol, saccharide, protein and starch.

Further, in an embodiment of the present invention, the organic carbon source solution contains at least one of industrial organic waste and kitchen waste.

Further, in an embodiment of the present invention, the organic carbon source solution contains at least one of industrial organic wastewater and municipal organic wastewater.

Further, in an embodiment of the present invention, wherein the sodium sulfate is sulfate.

Further, in an embodiment of the present invention, an organic carbon content of the organic solution is 10-1000 mg/L.

Further, in an embodiment of the present invention, the geomembrane is a biorefractory material.

Further, in an embodiment of the present invention, wherein the geomembrane is a biodegradable material.

Further, in an embodiment of the present invention, the geomembrane includes mesh holes having an equivalent diameter of 1-100 mm, and a distance between two adjacent mesh holes is 0.01-10 m.

Further, in an embodiment of the present invention, the chromium-containing soil is replaced by a heavy metal-containing soil, and the heavy metal reacts with the sulfide to precipitate.

Further, in an embodiment of the present invention, the heavy metal is at least one of Cd, Pb, Zn, Cu, Hg, Sb and Ni.

A soil remediation agent is prepared by the biogas residue-based in situ and ectopic coupled detoxification method for hexavalent chromium-containing sites The biogas residue-based in situ and ectopic coupled detoxification method for hexavalent chromium-containing sites of the present invention has the following beneficial effects: by addition of a special ecological agent and special site maintenance, the method promotes the formation of a bacterial group represented by sulfate-reducing bacteria. The bacterial group can effectively reduce hexavalent chromium by utilizing the carbon source, and meanwhile convert sulfates to sulfides, thereby converting trivalent chromium reduced from hexavalent chromium to a more stable chromium sulfide precipitate.

Furthermore, it is should be noted that the method has the following advantages over conventional treatment method for chromium-containing soil:

1. The cultivated sulfate-reducing bacteria belongs to an indigenous flora of the site, which possess strong tolerance against various conditions, and are capable of mass proliferation on the site; the bacteria can constantly and effectively reduce hexavalent chromium without being ecologically problematic.

2. The sulfate-reducing bacteria contained in the biogas residue bacterial agent reduce sulfates in ferrous sulfate to form sulfides, thereby reducing hexavalent chromium more effectively while avoiding a secondary pollution by the sulfates 3. The biogas residue bacterial agent reduces hexavalent chromium via two major principles: the hexavalent chromium reduction as an original characteristic of the sulfate-reducing bacteria, the reaction rate of which is relatively slow; and, the hexavalent chromium reduction by the sulfides as metabolites of the sulfate-reducing bacteria, which is quick in reaction rate for being a chemical reaction, and thereby explaining the better efficacy of the present ecological bacterial agent over other bacterial agents on treating chromium-containing soil.

4. The reduced trivalent chromium and the sulfides, as metabolites of the sulfate-reducing bacteria, form a chromium sulfide precipitate, which is a more stable form of the trivalent chromium in the soil; this process is significantly better than other biochemical processes.

5. Due to the presence of anaerobic biogas residue and carbon source, a reducing atmosphere is formed, which can effectively alleviate the oxidation of ferrous iron by air and reduce the use of ferrous sulfate. At the same time, the method effectively combines the advantages of quick reduction and lasting effect from ferrous and biogas residue respectively, while avoiding the disadvantage that ferrous sulfate cannot continuously reduce hexavalent chromium.

6. The method utilizes biogas residue and organic waste as main raw materials, and thereby greatly reducing cost.

7. The method conducts in situ remediation for deep soil, and thereby avoiding excavation of deep soil and greatly reducing cost.

DETAILED DESCRIPTION OF THE PRESENT INVENTION

The technical solutions in the embodiments of the present invention will be clearly and completely illustrated below in order to clarify the objectives, technical solutions and advantages of the examples of the present invention. For the processes/methods performed in the embodiments, general conditions or those recommended by the manufacturer are meant unless specified otherwise in the embodiments. Reagents or instruments with no specified manufacturer are meant to be commercially available as conventional products.

The biogas residue-based in situ and ectopic coupled detoxification method for hexavalent chromium-containing sites of the examples of the present invention will be further illustrated below.

EXAMPLE 1

This embodiment provides a biogas residue-based in situ and ectopic coupled detoxification method for hexavalent chromium-containing sites, including steps:

(1) Potassium sulfate is mixed with solid residue in dry fermentation process of agricultural organic waste, alcohol, saccharide, protein and starch at such a ratio, that contents of dry biogas residue, solid and organic carbon are respectively 20%, 25% and 25% in a solution after the mixing, wherein a mass ratio of sulfate ($SO_4^{2-}$) to the organic carbon is 1:1 in the solution after the mixing. The mixed solution is reacted for 5 days to obtain a chromium-containing soil remediation agent.

(2) soil of 1-10 m is excavated from a surface of the chromium-containing site, then a geomembrane with mesh is laid at a bottom of the excavated site, and an impervious material is laid around the excavated site to build a semi-closed stockyard; wherein the geomembrane with mesh is a biorefractory material, a mesh hole of the geomembrane with mesh has an equivalent diameter of 100 mm, and a distance between two mesh holes is 10 m.

(3) The soil of step (2) is broken down to 20 mm and tiled on the semi-closed stockyard. The agent of step (1) and ferrous sulfate are mixed with the soil by spraying, wherein a mass ratio of ferrous: chromium-containing soil: the agent is 0.1:1:0.8 after the mixing. Enter a stockpiling period.

(4) A moisture content of the soil is maintained at 60% in initial 100 days during the stockpiling period so as to allow biochemical reactions and mass proliferation of sulfate-reducing bacteria to take place, and the remediation agent or the carbon source solution of step (1) is applied to the site by spay irrigation every 200 days at an early stage and every 250 days at a later stage, such that a ratio of cumulative organic carbon from the repeatedly sprayed agent or carbon source solution to a total Cr(VI) content in the entire site is 1:1. The site has an average annual precipitation of 500 mm by natural precipitation and manual spraying.

After 10 days of the method implementation, soil hexavalent chromium content in the stockyard was rapidly reduced from 6058 mg/kg to 20 mg/kg. After 30 days, the content was further reduced to 5 mg/kg. After 2 years of the method implementation, the hexavalent chromium content in the soil in the stockyard and soil in a depth over 20 m is less than 2 mg/kg, and the groundwater contains Cr(VI) less than 0.1 mg/L.

The present embodiment further provides a soil remediation agent, prepared by the biogas residue-based in situ and ectopic coupled detoxification method for hexavalent chromium-containing sites of the present example.

EXAMPLE 2

This embodiment provides a biogas residue-based in situ and ectopic coupled detoxification method for hexavalent chromium-containing sites, including steps:

(1) Sodium sulfate is mixed with solid residue in semi-dry fermentation process of food industrial organic waste and a solution of organic solid waste containing industrial organic waste and kitchen waste at such a ratio, that contents of dry biogas residue, solid and organic carbon are respectively 10%, 12.5% and 12.5% in a solution after the mixing, wherein a mass ratio of sulfate ($SO_4^{2-}$)/organic carbon is 0.5:1 in the solution after the mixing. The mixed solution is reacted for 2.5 days to obtain a chromium-containing soil remediation agent.

(2) 5 m soil is excavated from a surface of the chromium-containing site, then a geomembrane with mesh is laid at a bottom of the excavated site, and an impervious material is laid around the excavated site to build a semi-closed stockyard; wherein the geomembrane with mesh is a biorefractory material, a mesh hole of the geomembrane with mesh has an equivalent diameter of 50 mm, and a distance between two mesh holes is 5 m.

(3) The soil of step (2) is broken down to 15 mm and tiled on the semi-closed stockyard. The agent of step (1) and ferrous sulfate are mixed with the soil by spraying, wherein a mass ratio of ferrous: chromium-containing soil: the agent is 0.05:1:0.5 after the mixing. Enter a stockpiling period.

(4) A moisture content of the soil is maintained at 30% in initial 53 days during the stockpiling period so as to allow biochemical reactions and mass proliferation of sulfate-reducing bacteria to take place, and the remediation agent or the carbon source solution of step (1) is applied to the site by spay irrigation every 100 days at an early stage and every 250 days at a later stage, such that a ratio of cumulative organic carbon from the repeatedly sprayed agent or carbon source solution to a total Cr(VI) content in the entire site is 0.8:1. The site has an average annual precipitation of 350 mm by natural precipitation and manual spraying.

After 10 days of the method implementation, soil hexavalent chromium content in the stockyard was rapidly reduced from 3058 mg/kg to 20 mg/kg. After 30 days, the content was further reduced to 5 mg/kg. After 2 years of the method implementation, the hexavalent chromium content in the soil in the stockyard and soil in a depth over 20 m is less than 2 mg/kg, and the groundwater contains Cr(VI) less than 0.1 mg/L.

This embodiment further provides a soil remediation agent, prepared by the biogas residue-based in situ and ectopic coupled detoxification method for hexavalent chromium-containing sites of the present example.

EXAMPLE 3

This embodiment provides a biogas residue-based in situ and ectopic coupled detoxification method for hexavalent chromium-containing sites, including steps:

(1) Sodium sulfate is mixed with solid residue in wet anaerobic fermentation process of agricultural and food industrial organic waste, industrial wastewater and municipal wastewater at such a ratio, that contents of dry biogas residue, solid and organic carbon are respectively 0.1%, 0.5% and 0.5% in a solution after the mixing, and a mass ratio of sulfate ($SO_4^{2-}$) to the organic carbon is 0.1:1 in the solution after the mixing. The mixed solution is a chromium-containing soil remediation agent.

(2) 1 m soil is excavated from a surface of the chromium-containing site, then a geomembrane with mesh is laid at a bottom of the excavated site, and an impervious material is laid around the excavated site to build a semi-closed stockyard; wherein the geomembrane with mesh is a biorefractory material, a mesh hole of the geomembrane with mesh has an equivalent diameter of 1 mm, and a distance between two mesh holes is 0.01 m.

(3) The soil of step (2) is broken down to 10.1 mm and tiled on the semi-closed stockyard. The agent of step (1) and ferrous sulfate are mixed with the soil by spraying, wherein a mass ratio of ferrous: chromium-containing soil: the agent is 0.01:1:0.1 after the mixing. Enter a stockpiling period.

(4) A moisture content of the soil is maintained at 5% in initial 5 days during the stockpiling period so as to allow biochemical reactions and mass proliferation of sulfate-reducing bacteria to take place, and the remediation agent or the carbon source solution of step (1) is applied to the site by spay irrigation every other day at an early stage and every 50 days at a later stage, such that a ratio of cumulative organic carbon from the repeatedly sprayed agent or carbon source solution to a total Cr(VI) content in the entire site is 0.5:1. The site has an average annual precipitation of 205 mm by natural precipitation and manual spraying.

After 10 days of the method implementation, soil hexavalent chromium content in the stockyard was rapidly reduced from 921 mg/kg to 20 mg/kg. After 30 days, the content was further reduced to 5 mg/kg. After 2 years of the method implementation, the hexavalent chromium content in the soil in the stockyard and soil in a depth over 20 m is less than 2 mg/kg, and the groundwater contains Cr(VI) less than 0.1 mg/L.

This embodiment further provides a soil remediation agent, prepared by the biogas residue-based in situ and ectopic coupled detoxification method for hexavalent chromium-containing sites of the present example.

EXAMPLE 4

This embodiment provides a biogas residue-based in situ and ectopic coupled detoxification method for hexavalent chromium-containing sites, including steps:

(1) Sodium sulphate is mixed with biogas residue or a carbon source at such a ratio, that contents of dry biogas residue, solid and organic carbon are respectively 0.1%, 0.5% and 0.5% in a solution after the mixing. The mixed solution is a chromium-containing soil remediation agent.

(2) 1 m soil is excavated from a surface of the chromium-containing site, then a geomembrane with mesh is laid at a bottom of the excavated site, and an impervious material is laid around the excavated site to build a semi-closed stockyard.

(3) The soil of step (2) is broken down to 10.1 mm and tiled on the semi-closed stockyard. The agent of step (1) and ferrous sulfate are mixed with the soil by spraying, wherein a mass ratio of ferrous: chromium-containing soil: the agent is 0.01:1:0.1 after the mixing. Enter a stockpiling period.

(4) A moisture content of the soil is maintained at 5% in initial 5 days during the stock piling period so as to allow biochemical reactions and mass proliferation of sulfate-reducing bacteria to take place, and the remediation agent or the carbon source solution of step (1) is applied to the site by spay irrigation every other day at an early stage and every 50 days at a later stage, such that a ratio of cumulative organic carbon from the repeatedly sprayed agent or carbon source solution to a total Cr(VI) content in the entire site is 0.5:1. The site has an average annual precipitation of 201 mm by natural precipitation and manual spraying that combines a use of an organic solution having an organic carbon content of 1000 mg/L.

After 10 days of the method implementation, soil hexavalent chromium content in the stockyard was rapidly reduced from 786 mg/kg to 20 mg/kg. After 30 days, the content was further reduced to 5 mg/kg. After 2 years of the method implementation, the hexavalent chromium content in the soil in the stockyard and soil in a depth over 20 m is less than 2 mg/kg, and the groundwater contains Cr(VI) less than 0.1 mg/L.

This embodiment further provides a soil remediation agent, prepared by the biogas residue-based in situ and ectopic coupled detoxification method for hexavalent chromium-containing sites of the present example.

EXAMPLE 5

This embodiment provides a biogas residue-based in situ and ectopic coupled detoxification method for hexavalent chromium-containing sites, which is substantially the same as the method of Example 4, except in the corresponding step (4): the organic solution sprayed has an organic carbon content of 495 mg/L.

This embodiment further provides a soil remediation agent, prepared by the biogas residue-based in situ and ectopic coupled detoxification method for hexavalent chromium-containing sites of the present example.

EXAMPLE 6

This embodiment provides a biogas residue-based in situ and ectopic coupled detoxification method for hexavalent chromium-containing sites, which is substantially the same as the method of Example 5, except in the corresponding step (4): the organic solution sprayed has an organic carbon content of 10 mg/L.

The present example further provides a soil remediation agent, prepared by the biogas residue-based in situ and ectopic coupled detoxification method for hexavalent chromium-containing sites of the present example.

EXAMPLE 7

The present example provides a biogas residue-based in situ and ectopic coupled detoxification method for Cd (cadmium)-containing sites, which is substantially the same as the method of Example 6, except that the present example aims to remediate Cd-containing soil. The heavy metal pollutant cadmium contained in the soil forms a precipitate with sulfides in the present example.

The present example further provides a soil remediation agent, prepared by the biogas residue-based in situ and ectopic coupled detoxification method for Cd sites of the present example.

EXAMPLE 8

The present example provides a biogas residue-based in situ and ectopic coupled detoxification method for Pb (lead)-containing sites, which is substantially the same as the method of Example 6, except that the present example aims to remediate Pb-containing soil. The heavy metal pollutant Pb contained in the soil forms a precipitate with sulfides in the present example.

This embodiment further provides a soil remediation agent, prepared by the biogas residue-based in situ and ectopic coupled detoxification method for Pb sites of the present example.

EXAMPLE 9

This embodiment provides a biogas residue-based in situ and ectopic coupled detoxification method for Zn (zinc)-containing sites, which is substantially the same as the method of Example 6, except that the present example aims to remediate Zn-containing soil. The heavy metal pollutant Zn contained in the soil forms a precipitate with sulfides in the present example.

The present example further provides a soil remediation agent, prepared by the biogas residue-based in situ and ectopic coupled detoxification method for Zn sites of the present example.

EXAMPLE 10

The present example provides a biogas residue-based in situ and ectopic coupled detoxification method for Cu (copper)-containing sites, which is substantially the same as the method of Example 6, except that the present example aims to remediate Cu-containing soil. The heavy metal pollutant Cu contained in the soil forms a precipitate with sulfides in the present example.

The present example further provides a soil remediation agent, prepared by the biogas residue-based in situ and ectopic coupled detoxification method for Cu sites of the present example.

EXAMPLE 11

The present example provides a biogas residue-based in situ and ectopic coupled detoxification method for Hg (mercury)-containing sites, which is substantially the same as the method of Example 6, except that the present example aims to remediate Hg-containing soil. The heavy metal pollutant Hg contained in the soil forms a precipitate with sulfides in the present example.

The present example further provides a soil remediation agent, prepared by the biogas residue-based in situ and ectopic coupled detoxification method for Hg sites of the present example.

EXAMPLE 12

The present example provides a biogas residue-based in situ and ectopic coupled detoxification method for Sb (antimony)-containing sites, which is substantially the same as the method of Example 6, except that the present example aims to remediate Sb-containing soil. The heavy metal pollutant Sb contained in the soil forms a precipitate with sulfides in the present example.

The present example further provides a soil remediation agent, prepared by the biogas residue-based in situ and ectopic coupled detoxification method for Sb sites of the present example.

EXAMPLE 13

The present example provides a biogas residue-based in situ and ectopic coupled detoxification method for Ni (nickel)-containing sites, which is substantially the same as the method of Example 6, except that the present example aims to remediate Ni-containing soil. The heavy metal pollutant Ni contained in the soil forms a precipitate with sulfides in the present example.

The present example further provides a soil remediation agent, prepared by the biogas residue-based in situ and ectopic coupled detoxification method for Ni sites of the present example.

COMPARATIVE EXAMPLE

In order to prove a better soil remediation effect of the biogas residue-based in situ and ectopic coupled detoxification method for hexavalent chromium-containing sites and the soil remediation agent provided in the examples of the present invention, the in situ remediation method for hexavalent chromium-containing sites by using organic waste disclosed by Patent No. 20130645078 is used herein as a comparative example.

Specifically, both of the present example and Example 1 treat chromium-containing soil by utilizing microbes and organic carbon sources, but the implementation of the present example has certain limitations. The method of the present example is a typical in situ remediation method with a drawback of inability to preserve microbes, carbon sources and water, which inevitably leads to irregular seepage of these substances into soil and thereby causes secondary pollution. Therefore, the method of the present example can only be applied to sites with natural impervious layers. Furthermore, the present example has a slow remediation effect as it treats contaminated soil only by microbes in sludge, while being unsuitable for high-concentration sites as microbes cannot tolerate hexavalent chromium at high concentrations.

Example 1 adopts an in-situ and ectopic coupled method to treat contaminated sites, wherein a topsoil is treated ectopically. The method allows quick soil remediation with microbes, carbon sources and water preserved effectively in a stockyard, which provides favorable growth conditions for the microbes. The microbes seep into a deep soil through mesh holes of an impervious membrane laid on the stockyard in a later stage. Therefore, the process combines the advantages of both in situ and ectopic treatment. Moreover, the process is coupled with ferrous sulfate method and microbial method to treat the soil, wherein ferrous sulfate is far superior to microbes in terms of speed of reducing hexavalent chromium. By adding appropriate amount of ferrous sulfate, the hexavalent chromium in the soil is quickly reduced to a lower concentration, while the residual hexavalent chromium is further reduced by microbes. Therefore, the method of the present invention is superior in remediation and purification capacity, thereby being able to treat sites contaminated by high concentration hexavalent chromium.

In summary, the embodiments of the present invention provides a soil remediation agent containing sulfate-reducing bacteria, and simultaneously provides to treat chromium-containing sites by combing the use of ferrous sulfate. As a result, the sulfate-reducing bacteria reduce sulfates in the ferrous sulfate and forms sulfides, thereby preventing a secondary pollution by sulfates while achieving efficient reduction of hexavalent chromium. The method is more applicable as cutting down cost significantly by utilizing biogas residue and organic waste as main raw materials. Deep soil excavation is also avoided as the method adopts in situ remediation treatment, which further reduces the cost. Therefore, by preparing the soil remediation agent and combining in situ and ectopic biological/chemical remediation treatment, the biogas residue-based in situ and ectopic coupled detoxification method for hexavalent chromium-containing sites of the examples of the present invention achieves effective remediation for deep chromium-containing sites, as well as low cost and waste recycling, and thereby being of great value for promotion and practice.

The embodiments described above are only partial embodiments of the present invention. The detailed description of the embodiments of the invention is not intended to limit the scope of the invention, but only to illustrate the embodiments chosen by the invention. In view of the examples of the invention, all other embodiments that can be obtained by those skilled in the art without inventive steps should also be within the scope of the present invention

INDUSTRIAL APPLICABILITY

The present invention provides the soil remediation agent containing the sulfate-reducing bacteria, which reduce sulfates in ferrous sulfate to form sulfides, thereby achieving effective reduction of hexavalent chromium while further avoiding a secondary pollution by sulfates. The method cuts down cost significantly by utilizing biogas residue and organic waste as main raw materials, and also avoids deep soil excavation by adopting in situ and ectopic coupled remediation treatment, which further reduces the cost. Therefore, by preparing the soil remediation agent and combining in situ and ectopic biological/chemical remediation treatment, the biogas residue-based in situ and ectopic coupled detoxification method for hexavalent chromium-containing sites of the present invention achieves effective remediation for deep chromium-containing sites, as well as low cost and waste recycling, and thereby being of great value for promotion and practice.

What is claimed is:

1. A biogas residue-based in situ and ectopic coupled detoxification method for hexavalent chromium-containing site, comprising:
   (1) mixing sulfate, the biogas residue and an organic carbon source solution to obtain a mixture, wherein in the mixture, contents of dry biogas residue, solid and organic carbon are respectively 0.1-20%, 0.5-25% and 0.5-25%; wherein a mass ratio of sulfate ($SO_4^{2-}$) to the organic carbon is (0-1): 1; reacting the mixture for 0-5 days to obtain a chromium-containing soil remediation agent;
   (2) excavating 1-10m soil from a surface of the chromium-containing site, laying a geomembrane with mesh at a bottom of the excavated site, and laying an impervious material around the excavated site to build a semi-closed stockyard;
   (3) breaking the soil of step (2) to less than 10mm, tiling the broken soil on the semi-closed stockyard, mixing the tiled soil with the chromium-containing soil remediation agent and ferrous sulfate by spraying; wherein a mixing ratio between the ferrous sulfate, the tiled soil and the chromium-containing soil remediation agent is (0-0.1): 1: (0.1-0.8); entering a stockpiling period; and
   (4) maintaining a moisture content of the soil in a range of 5-60% in initial 5-100 days during the stockpiling period, and injecting the chromium-containing soil remediation agent or the organic carbon source solution into the site every 1-200 days, such that a ratio of cumulative organic carbon from the repeatedly injected chromium-containing soil remediation agent or the organic carbon source solution to a total Cr(VI) content in the entire site is not less than 0.5:1;

wherein the site has an average annual rainfall of more than 200 mm, otherwise spraying the surface of the site with water or organic solution to allow the chromium-containing soil remediation agent to continuously seep into a lower layer of the site.

2. The method of claim 1, wherein the biogas residue is a solid residue in an anaerobic treatment process for organic waste of industry, municipal industry, agriculture or food industry.

3. The method of claim 2, wherein the anaerobic treatment process is performed by adopting a dry, semi-dry or wet treatment during the anaerobic treatment process.

4. The method of claim 1, wherein the organic carbon source solution contains at least one of alcohol, saccharide, protein and starch.

5. The method of claim 4, wherein the organic carbon source solution contains at least one of industrial organic waste and kitchen waste.

6. The method of claim 1, wherein the organic carbon source solution contains at least one of industrial organic waste water and municipal organic waste water.

7. The method of claim 1, wherein the sulfate is sodium sulfate.

8. The method of claim 1, wherein an organic carbon content of the organic solution is 10-1000 mg/L.

9. The method of claim 1, wherein the geomembrane is a biorefractory material.

10. The method of claim 1, wherein the geomembrane is a biodegradable material.

11. The method of claim 1, wherein the geomembrane comprises mesh holes having an equivalent diameter of 1-100 mm, and a distance between two adjacent mesh holes is 0.01-10 m.

* * * * *